(12) United States Patent
Lee et al.

(10) Patent No.: US 11,954,162 B2
(45) Date of Patent: Apr. 9, 2024

(54) RECOMMENDING INFORMATION TO PRESENT TO USERS WITHOUT SERVER-SIDE COLLECTION OF USER DATA FOR THOSE USERS

(71) Applicant: SAMSUNG ELECTRONICS CO., LTD., Gyeonggi-Do (KR)

(72) Inventors: Dongjin Lee, San Jose, CA (US); Dongyun Jin, San Jose, CA (US); Rezwana Karim, Sunnyvale, CA (US); Zhi Nie, Sunnyvale, CA (US); Rishikesh Ghewari, Sunnyvale, CA (US); Yinan Li, Mountain View, CA (US); Mingyang Wang, Santa Clara, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/039,305

(22) Filed: Sep. 30, 2020

(65) Prior Publication Data
US 2022/0100809 A1    Mar. 31, 2022

(51) Int. Cl.
*G06F 16/9535* (2019.01)
*G06F 16/28* (2019.01)
*G06F 16/9538* (2019.01)

(52) U.S. Cl.
CPC ........ *G06F 16/9535* (2019.01); *G06F 16/287* (2019.01); *G06F 16/9538* (2019.01)

(58) Field of Classification Search
CPC .................................................. G06F 16/9538
See application file for complete search history.

(56) References Cited

U.S. PATENT DOCUMENTS

| 8,468,164 B1 * | 6/2013 | Paleja ................. H04L 67/1097 708/805 |
| 10,390,062 B2 | 8/2019 | Louboutin |
| 10,437,889 B2 | 10/2019 | Greystoke et al. |

(Continued)

FOREIGN PATENT DOCUMENTS

| KR | 102129160 B1 | 7/2020 |
| WO | 2022071635 A1 | 4/2022 |

OTHER PUBLICATIONS

WIPO Appln. PCT/KR2021/000714, International Search Report, dated Jun. 29, 2021, 3 pg.

*Primary Examiner* — Brittany N Allen
(74) *Attorney, Agent, or Firm* — Cuenot, Forsythe & Kim, LLC

(57) ABSTRACT

A client device can identify user data pertaining to use of the client device by a user. The client device can determine at least one persona trait of the user based on the user data pertaining to the use of the client device by the user. The client device can receive persona categorization data, the persona categorization data specifying a plurality of persona categories and, for each persona category, a plurality of persona traits. Based on the at least one determined persona trait, the client device can assign the user to a persona category selected from the plurality of persona categories. Based on the persona category to which the user is assigned, the client device can identify information to present to users who are assigned to the persona category to which the user is assigned. The client device can present to the user the identified information.

15 Claims, 7 Drawing Sheets

(56) References Cited

U.S. PATENT DOCUMENTS

| | | |
|---|---|---|
| 10,783,149 B2 | 9/2020 | Osotio et al. |
| 11,294,536 B2 | 4/2022 | Brett et al. |
| 2002/0188589 A1* | 12/2002 | Salmenkaita ....... G06F 16/9537 |
| 2007/0156614 A1* | 7/2007 | Flinn ..................... G06N 20/00 |
| | | 706/12 |
| 2009/0240647 A1 | 9/2009 | Green et al. |
| 2011/0320307 A1* | 12/2011 | Mehta ................ G06Q 30/0282 |
| | | 705/347 |
| 2012/0072283 A1* | 3/2012 | DeVore .............. G06Q 30/0251 |
| | | 705/14.49 |
| 2012/0290434 A1* | 11/2012 | Moritz ............... G06Q 30/0261 |
| | | 705/26.7 |
| 2014/0025609 A1* | 1/2014 | Coster ................ G06Q 30/0631 |
| | | 706/12 |
| 2014/0052683 A1* | 2/2014 | Kirkham .................. G06F 8/61 |
| | | 706/46 |
| 2017/0140426 A1* | 5/2017 | Chakraborty ...... G06Q 30/0255 |
| 2017/0206276 A1 | 7/2017 | Gill |
| 2018/0018590 A1* | 1/2018 | Szeto .................... G16H 50/20 |
| 2018/0108048 A1 | 4/2018 | Yoon et al. |
| 2019/0114151 A1 | 4/2019 | Jacobs et al. |
| 2020/0019842 A1* | 1/2020 | Kim ....................... G06N 3/088 |
| 2020/0045163 A1* | 2/2020 | Hwang ............. H04M 1/72451 |
| 2021/0136537 A1* | 5/2021 | Zaltzman ............. H04W 4/029 |

* cited by examiner

700

---

Identify user data pertaining to use of the client device by a user
702

↓

Determine at least one persona trait of the user based on the user data pertaining to the use of the client device by the user
704

↓

Receive persona categorization data, the persona categorization data specifying a plurality of persona categories and, for each persona category, a plurality of persona traits
706

↓

Based on the at least one determined persona trait of the user, assign the user to at least one persona category selected from the plurality of persona categories specified by the persona categorization data
708

↓

Based on the at least one of the persona category to which the user of the client device is assigned, identify information to present to users who are assigned to the at least one persona category to which the user is assigned
710

↓

Present to the user the identified information
712

FIG. 7

RECOMMENDING INFORMATION TO PRESENT TO USERS WITHOUT SERVER-SIDE COLLECTION OF USER DATA FOR THOSE USERS

TECHNICAL FIELD

This disclosure relates to data processing systems and, more particularly, to personalization of information provided by information services.

BACKGROUND

An information service is part of an information system that collects information from contributors and serves that information to users of client devices. For example, an information service may provide such information to users' computers, smart phones, televisions, etc. Examples of the information may include, but not be limited to, multimedia content, recommendations, advertisements, offers, and so on.

SUMMARY

In one or more embodiments, a method includes identifying, by a client device, user data pertaining to use of the client device by a user. The method also can include determining, by the client device, at least one persona trait of the user based on the user data pertaining to the use of the client device by the user. The method also can include receiving, by the client device, persona categorization data, the persona categorization data specifying a plurality of persona categories and, for each persona category, a plurality of persona traits. The method also can include, based on the at least one determined persona trait of the user, assigning, by the client device, the user to at least one persona category selected from the plurality of persona categories specified by the persona categorization data. The method also can include, based on the at least one of the persona category to which the user of the client device is assigned, identifying, by the client device, information to present to users who are assigned to the at least one persona category to which the user is assigned. The method also can include presenting, by the client device, to the user the identified information.

In one or more embodiments a client device includes a memory configured to store instructions and a processor coupled to the memory. The processor, in response to executing the instructions, is configured to initiate operations. The operations can include identifying, by a client device, user data pertaining to use of the client device by a user. The operations also can include determining, by the client device, at least one persona trait of the user based on the user data pertaining to the use of the client device by the user. The operations also can include receiving, by the client device, persona categorization data, the persona categorization data specifying a plurality of persona categories and, for each persona category, a plurality of persona traits. The operations also can include, based on the at least one determined persona trait of the user, assigning, by the client device, the user to at least one persona category selected from the plurality of persona categories specified by the persona categorization data. The operations also can include, based on the at least one of the persona category to which the user of the client device is assigned, identifying, by the client device, information to present to users who are assigned to the at least one persona category to which the user is assigned. The operations also can include presenting, by the client device, to the user the identified information.

In one or more embodiments, a computer program product includes a computer-readable storage medium having program code stored thereon. The program code is executable by a processor to perform operations. The operations can include identifying, by a client device, user data pertaining to use of the client device by a user. The operations also can include determining, by the client device, at least one persona trait of the user based on the user data pertaining to the use of the client device by the user. The operations also can include receiving, by the client device, persona categorization data, the persona categorization data specifying a plurality of persona categories and, for each persona category, a plurality of persona traits. The operations also can include, based on the at least one determined persona trait of the user, assigning, by the client device, the user to at least one persona category selected from the plurality of persona categories specified by the persona categorization data. The operations also can include, based on the at least one of the persona category to which the user of the client device is assigned, identifying, by the client device, information to present to users who are assigned to the at least one persona category to which the user is assigned. The operations also can include presenting, by the client device, to the user the identified information.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

FIG. 7 illustrates an example of a method of presenting information to a user based on persona categorization data.

DETAILED DESCRIPTION

Figure 1:
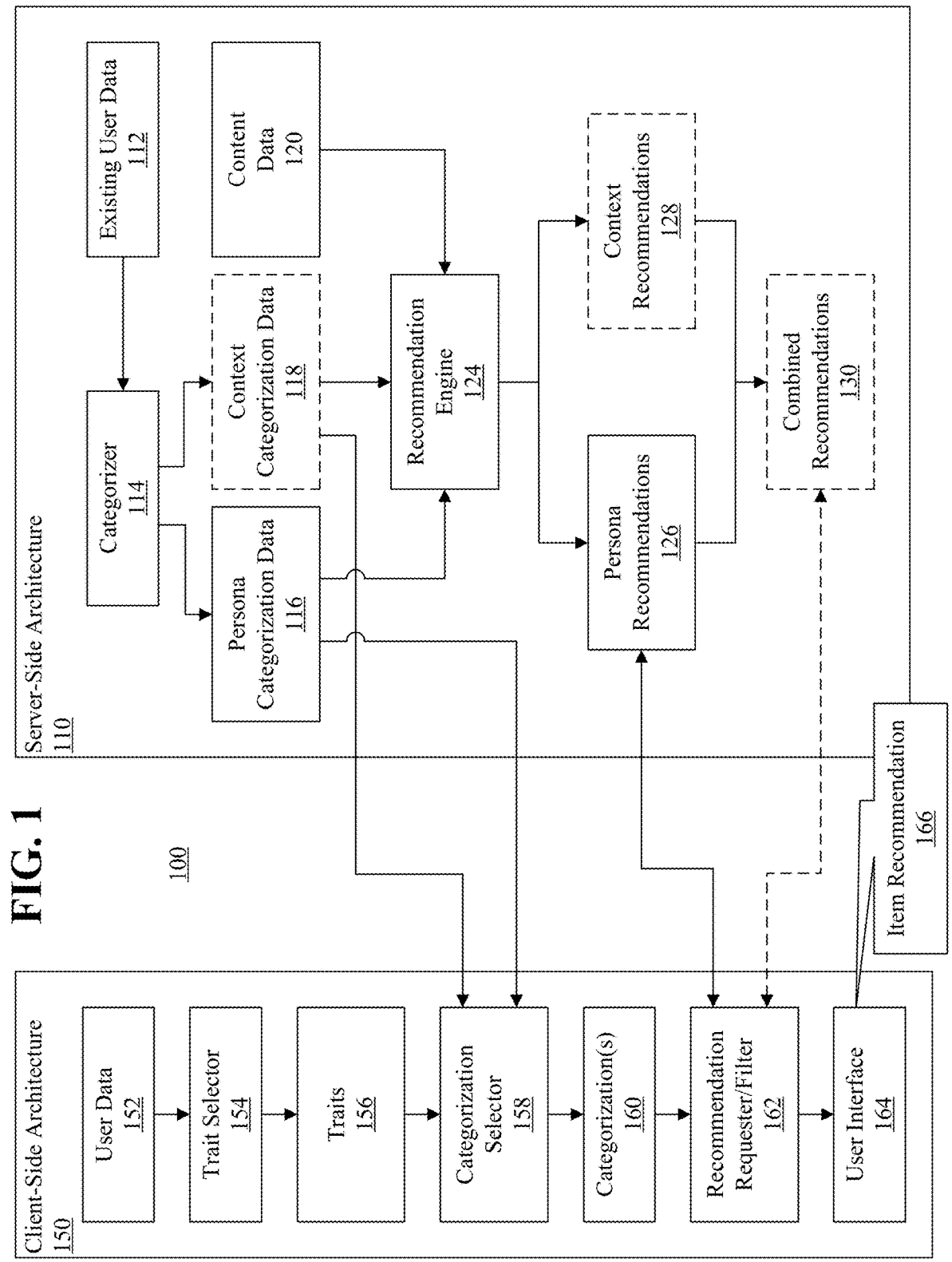
FIG. 1 is a diagram illustrating an example computing architecture.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to improving personalization of information services. Most information services collect from client devices user data (e.g., private data) to their servers and pre-process the collected data to infer user preferences. Some countries and states have strict privacy policies that restrict collection of user data considered to be private data. Moreover, some users prefer to not have such user data collected on servers and opt out of user data collection. The restriction of user data collection results in less data being available to personalize information presented to users, thus reducing the accuracy of personalization determinations automatically made by the information services. As a result, information services oftentimes present to users information that is not relevant to the users.

The arrangements described herein overcome such obstacles. Specifically, the arrangements described herein improve the accuracy of personalization determinations made for users whose user data are not collected to servers. Thus, the relevancy of information presented to such users by the information services is greatly improved. Moreover, the arrangements described herein reduce the amount of data that need be processed by the information system servers in real time, thus improving the performance of the servers by freeing up data processing resources, such as memory resources, processor resources and network resources. In this regard, conventional personalization algorithms are data processing resource intensive, especially when performed for large numbers of users in real time. The arrangements described herein reduce the amount of such processing that need be performed on such servers.

In accordance with the inventive arrangements disclosed herein, rather than an information service collecting on its data processing systems (e.g., servers) user data for all users to whom personalized information is provided, previously collected user data, for example user data from users who have consented to their user data being collected by the information service, can be processed by a data processing system to generate persona categorization data. The persona categorization data can specify a plurality of persona categories. For each persona category, the persona categorization data can specify one or more persona traits. Examples of such persona categories and persona traits are discussed herein.

Optionally, the previously collected user data can be processed by a data processing system to generate context categorization data. The context categorization data can specify a plurality of client device use contexts. For each client device use context, the context categorization can specify one or more context traits. Examples of such client device use contexts and context traits are discussed herein in further detail.

The persona categorization data and context categorization data need not be generated in real time. In illustration, the data processing systems can be configured to generate the persona categorization data and context categorization data at times when the data processing systems are lightly loaded with other workloads. For example, a threshold level of processor utilization and/or a threshold level of memory utilization for the data processing systems can be specified, for instance by a system administrator, and the data processing systems can be configured to execute algorithms to generate persona categorization data and context categorization data when the processor utilization and/or memory utilization drop below the respective threshold levels. In another example, peak times (e.g., days, hours and/or minutes) when the data processing systems typically are heavily loaded can be specified, for example by a system administrator, and the data processing systems can be configured to execute algorithms to generate persona categorization data and context categorization data at times other than the specified peak times.

For a user for whom user data is not being collected by the data processing systems of the information service, the user's client device can store, at least temporarily, the user data. For example, the client device can identify user data pertaining to the user's use of the client device and store such user data to a data storage device of the client device. The client device can determine at least one persona trait of the user based on the user data. In illustration, the information service can communicate to the client device an application containing one or more algorithms that process user data to identify persona traits, and the client device can execute the application to determine the persona trait(s). Optionally, the application also can contain one or more algorithms that process user data to identify context traits relating to the context in which users use client devices, and the client device can execute the application to determine the context trait(s). For example, the client device can determine one or more context traits relating the user's present use of the client device. The application also can include the previously discussed persona categorization data and context categorization data generated by the data processing systems of the information service.

Based on the determined persona trait(s) of the user, the client device, executing the application, can assign the user to at least one persona category selected from a plurality of persona categories specified by the persona categorization data. Optionally, based on the context traits relating to the user's use of the client device (e.g., a present use of the client device), the client device, executing the application, also can assign the use of the client device by the user to at least one context category selected from the plurality of context categories specified by the context categorization data.

Based on the persona category(ies) to which the client device assigns the user and, optionally, the context category(ies) to which the client device assigns the use of the client device by the user, the client device can execute the application to identify information to present to the user and present to the user the identified information. The information can include, for example, a recommendation for the user to view multimedia content, one or more advertisements, one or more offers, etc., a recommendation to install an application, a recommendation to patronize a business, and so on.

In a non-limiting arrangement, the client device can communicate, to a data processing system of the information service, the persona category(ies) and, optionally, the context category(ies) to which the user is assigned. Responsive to receiving that data, the data processing system of the information service can process the data to determine one or more recommendations of information to present to the user and communicate such recommendations to the client device. Responsive to receiving the recommendations from the data processing system of the information service, the client device can select one or more of the recommendations and present the selected recommendation(s) to the user.

In another non-limiting arrangement, the data processing system of the information service can communicate to the client device a list of recommendations corresponding to different persona categories and, optionally, different client device use contexts. Based on the persona category to which the user is assigned and, optionally, the context category to which use of the client device by the user (e.g., a present use of the client device by the user) is assigned, the client device can select one or more recommendations from the list of recommendations and present the selected recommendation(s) to the user. Thus, in such an arrangement, the persona category(ies) of the user and the context category(ies) need not be communicated to the information service.

Based on experimental results and expected outcomes, the accuracy of recommendations provided by the present arrangements, without communicating a user's private data to a data processing system of an information service, is higher than at least 85% of the accuracy of recommendations provided by the information service when the information service actually receives and processes the user's private data. In contrast, recommendations provided without any form of personalization is only about 30% of the accuracy of recommendations provided by the information service when the information service receives and processes the user's private data.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a diagram illustrating an example computing architecture 100. The computing architecture 100 can be implemented, for example, for an information service. The computing architecture 100 can include server-side architecture 110 and client-side architecture 150. The server-side architecture 110 represents the software/data architecture that can be implemented on a data processing system, for example on a server or among a plurality of servers, of an information service. The client-side architecture 150 represents the software/data architecture that can be implemented on each of a plurality of client devices.

The server-side architecture 110 can include existing user data 112. The existing user data 112 can pertain to users other than the user of the client device. In particular, the existing user data 112 can include data previously collected from users who have consented to their user data being collected by the information service. The existing user data 112 also can include, for example, user data obtained from other services, users in other locations, publicly available user data, user data provided by third party sources, and so on. The information service can update the existing user data 112 with new user data, for example in-real time as the user data is collected or otherwise becomes available, and/or the information service can update the existing user data 112 at periodic time intervals. In a non-limiting example, the information service can update the existing user data 112, in real time, with user data that is collected, and periodically update the existing user data 112 with user data obtained from other services, users in other locations, publicly available user data, user data provided by third party sources, and so on.

The existing user data 112 can include, for example, time series data and features pertaining to previous use of client devices by the various users. The following table 1 presents an example of the time series data pertaining to purchases made by users using their respective client devices.

TABLE 1

| user_id | merchant_name | merchant_category | transaction_amount | timestamp |
|---------|---------------|-------------------|--------------------|-----------|
| uid_5392 | Merchant1 | Restaurant | $16.30 | 1533922354 |
| uid_1232 | Merchant2 | Gas Station | $44.20 | 1533922414 |
| uid_6433 | Merchant3 | Retail Store | $72.50 | 1533922549 |
| uid_0345 | Merchant4 | Café | $9.20 | 1533923119 |
| uid_5657 | Merchant5 | Online Shopping | $31.90 | 1533923301 |
| ... | ... | ... | ... | ... |

In the example presented in table 1, the time series data can include a user identifier for a user who made a purchase, a name of the merchant with which the purchase was made, a category of the purchase, a transaction amount for the purchase, and a time stamp indicating when the purchase took place. In this regard, in table 1 each row of data indicates a particular record for a particular purchase transaction. Other types of uses of client devices by users also can be included in the exiting user data 112, for example application usage by such users, geographic locations of merchants, geographic locations of the users, and so on.

The computing architecture 100 also can include a categorizer 114 configured to categorize the existing user data 112 into categories. Initially, the categorizer 114 can process the existing user data 112 to identify traits in the existing user data 112. The categorizer 114 can consolidate those traits into trait data which may be processed using machine learning algorithms. The following table 2 presents an example of feature data consolidated from existing user data 112.

TABLE 2

| user_id | restaurant | gas | Retail | online | ... |
|---------|------------|-----|--------|--------|-----|
| uid_0000 | $467.20 | $120.40 | $58.00 | $0.00 | ... |
| uid_0001 | $31.50 | $466.50 | $211.60 | $32.56 | ... |
| uid_0002 | $107.00 | $132.60 | $0.00 | $123.60 | ... |
| uid_0003 | $231.50 | $0.00 | $512.50 | $0.00 | ... |
| uid_0004 | $760.12 | $0.00 | $82.10 | $645.10 | ... |
| ... | ... | ... | ... | ... | ... |

In this example, the trait data can indicate a user identifier for each of a plurality of users, and for each user identifier, an amount of expenditures spent at restaurants, an amount of expenditures spent on gasoline, an amount of expenditures spent at retail establishments, an amount of expenditures spent for online purchases, and so on.

The categorizer 114 can normalize the trait data, for example to a value from 0 to 1. The following table 3 presents an example of the normalization of the trait data from table 2.

TABLE 3

| user_id | restaurant | gas | retail | online | ... |
|---|---|---|---|---|---|
| uid_0000 | 0.55 | 0.20 | 0.08 | 0.00 | ... |
| uid_0001 | 0.04 | 0.78 | 0.30 | 0.04 | ... |
| uid_0002 | 0.13 | 0.22 | 0.00 | 0.15 | ... |
| uid_0003 | 0.27 | 0.00 | 0.73 | 0.00 | ... |
| uid_0004 | 0.89 | 0.00 | 0.12 | 0.81 | ... |
| ... | ... | ... | ... | ... | ... |

The categorizer 114 can process the normalized trait data to reduce dimensionality of the trait data, for example by performing principle component analysis (PCA) on the normalized trait data. PCA is known to those skilled in the art. The following table 4 presents an example of a result of performing PCA on the normalized trait data of table 3.

TABLE 4

| user_id | pca_0 | pca_1 | pca_2 | pca_3 | pca_4 |
|---|---|---|---|---|---|
| uid_0000 | 0.12 | 0.33 | 0.87 | 0.05 | 0.02 |
| uid_0001 | 0.08 | 0.42 | 0.11 | 0.35 | 0.14 |
| uid_0002 | 0.31 | 0.14 | 0.01 | 0.45 | 0.54 |
| uid_0003 | 0.17 | 0.81 | 0.23 | 0.70 | 0.34 |
| uid_0004 | 0.58 | 0.09 | 0.61 | 0.10 | 0.06 |
| ... | ... | ... | ... | ... | ... |

Figure 2:
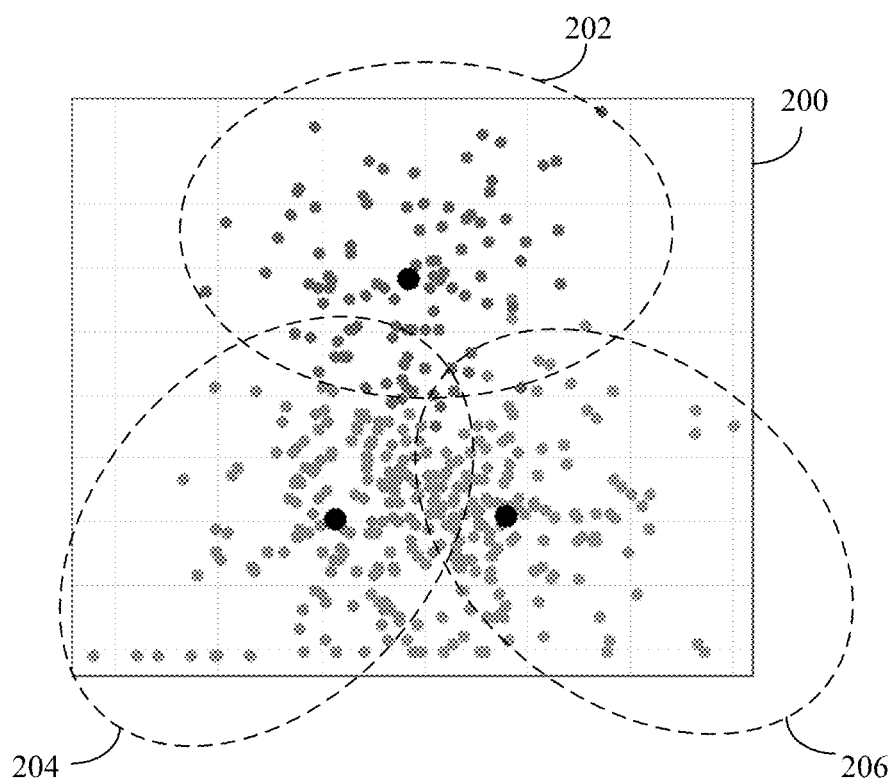
FIG. 2 illustrates an example chart on which groups of data are plotted.

The categorizer 114 can perform a K-means clustering algorithm, which is known in the art, on the reduced dimension trait data to create categories. FIG. 2 illustrates an example chart 200 on which groups of data 202, 204, 206 are plotted. In this example, the chart 200 represents a clustering of three groups of data plotted according to results of the K-means clustering algorithm. The categorizer 114 can automatically adjust the number of groups of data 202, 204, 206 based on an optimization of balance score among the groups of data 202, 204, 206. For example, the categorizer 114 can measure the similarity between groups of data 202, 204 using cosine similarity. If there exist multiple groups that are too similar to each other (e.g., a measure of similarity is within a threshold level of similarity), the categorizer 114 can reduce the number of groups. On the other hand, the categorizer 114 can measure the similarity of data within a same group of data 202. If the data in the group is too diverse (e.g., a measure of diversity is above a threshold level), the categorizer 114 can increase the number of groups. The threshold level of similarity and the threshold level of diversity can be specified, for example by a system administrator. In another arrangement, the threshold level of similarity and the threshold level of diversity can be automatically determined, for example by applying an algorithm that selects the threshold levels based on statistical processing of the data. In illustration, the algorithm can select the threshold levels based on standard deviations of data.

The categorizer 114 can categorize existing user data 112 that pertains to persona types into a plurality of persona categories. In illustration, based on results of the K-means clustering algorithm, the categorizer 114 can generate persona categorization data 116. The persona categorization data 116 can specify a plurality of persona categories and, for each persona category, a plurality of persona traits. By way of example, the categorizer 114 can determine each group of data 202, 204, 206 to represent a persona trait that groups of users have in common. The categorizer 114 can create respective categories for user groups that share common persona traits. Different persona traits of some users may be assigned to different categories in the persona categorization data 116. Examples of the persona categories include, but are not limited to, persona categories representing user spending habits, a persona category for users who frequently play a mobile action game on a client device, a persona category for users who frequently watch content on a client device, a persona category for users who frequently watch comedy content on a client device, a persona category for users who frequently watch drama content on a client device, a persona category for users who frequently use their client devices to select restaurants, and so on.

Figure 3:
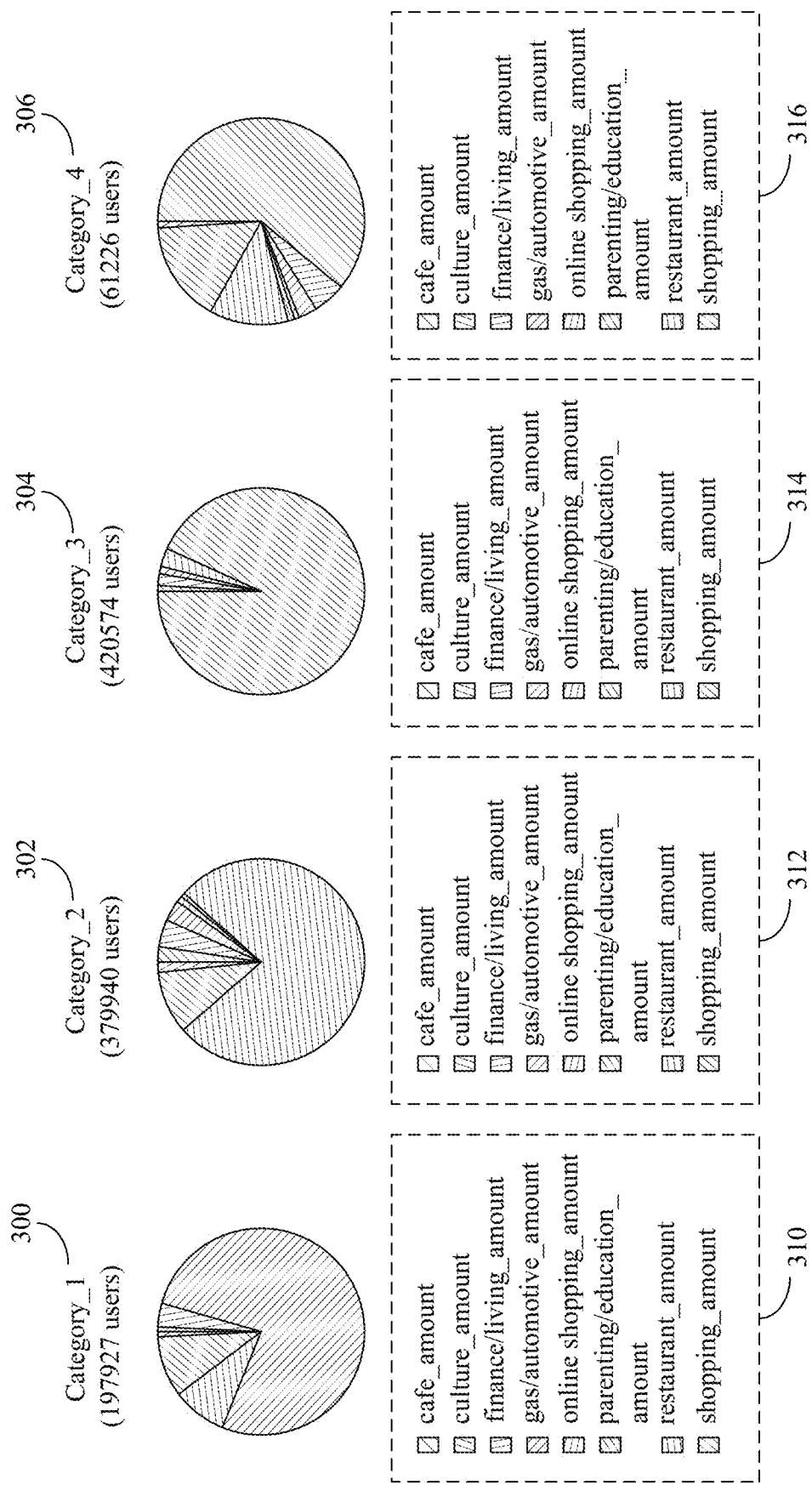
FIG. 3 illustrates examples of persona categories to which persona traits can be assigned.

FIG. 3 illustrates examples of persona categories 300, 302, 304, 306 to which persona traits 310, 312, 314, 316 can be assigned by the categorizer 114 based on use of existing user data 112 that is mobile payment transaction data. In this example, the persona traits 310, 312, 314, 316 represent ways in which users spend money, and the persona categories 300, 302, 304, 306 represent persona types having similar spending patterns. For example, a persona trait 310 of the persona category 300 is that the majority of spending is on gasoline and other automotive expenses. a persona trait 312 of the persona category 302 is that the majority of spending is at restaurants, a persona trait 314 of the persona category 304 is that the majority of spending is on shopping, and a persona trait 316 of the persona category 306 is that the majority of spending is at cafes. Still, any of a variety of other types of persona traits can be assigned to the persona categories 300, 302, 304, 306 and the present arrangements are not limited in this regard.

Referring again to FIG. 1, optionally, the categorizer 114 can categorize existing user data 112 that pertains to contextual information into a plurality of context categories, for example using processes similar to those described for categorizing existing user data 112 into persona categories. For instance, the categorizer 114 can categorize existing user data 112 that pertains to contextual information into a plurality of context categories based on context traits. In illustration, the categorizer 114 can generate context categorization data 118. The context categorization data 118 can specify a plurality of context categories and, for each context category, at least one context trait. By way of example, the categorizer 114 can compare existing user data 112 from various users and identify in the existing user data 112 various client device use contexts that groups of users have in common. The categorizer 114 can create respective context categories for user groups that share client device use contexts. Client device use contexts of some users may be assigned to more than one context category in the context categorization data 118. Examples of the context categories include, but are not limited to, presently watching content on a client device, presently performing outdoor activities while carrying a client device, commuting while using a client device (e.g., using a navigation feature of a client device), commuting on a particular highway, road or route while using a client device, and so on.

In an arrangement, the existing user data 112 can include keywords assigned to applications, businesses, content, etc. used by users. The categorizer 114 can select from the existing user data 112 a plurality of such keywords (e.g., thousands of such keywords), and use a sparse machine learning algorithm (e.g., sparse logistic regression, stability selection, etc.) to select a subset of the keywords based on the contribution of the keywords to the persona category and, optionally, the context category membership predictions. For each of a plurality of user identifiers contained in the existing user data 112, the categorizer 114 can calculate a value of each of the keywords in the subset. To calculate each value, the categorizer 114 can count the number of applications, businesses, content, etc. used by the user that include the keyword in their description. In another example pertaining to applications, the value for each keyword can be determined based on an amount of time the user used the application.

The following table 5 presents an example of values calculated for keywords.

TABLE 5

| user id | "game" | "car" | "golf" | "fashion" |
|---|---|---|---|---|
| uid_0 | 17 | 2 | 0 | 1 |
| uid_1 | 3 | 9 | 6 | 2 |
| uid_2 | 8 | 1 | 0 | 11 |
| ... | | | | |
| uid_n | 2 | 5 | 1 | 3 |

In table 5 each row of data indicates a record for a particular user. Each record can include a user identifier and, for each of the selected keywords in the subset, the value for the keyword determined for that user.

The categorizer 114 can process the values calculated for the keywords to train machine learning models to predict persona categorizations. For example, the categorizer 114 can use logic regression, random forest, etc. to train the machine learning models. The categorizer 114 can include the selected keywords and one or more trained machine learning models in the persona categorization data 116.

Optionally, categorizer 114 can select keywords associated with client device use contexts and train machine learning models to predict context categorizations in a manner similar to that described above. The categorizer 114 can include the selected keywords and one or more trained machine learning models in the context categorization data 118.

A reason for using a subset of the keywords in the existing user data 112, as opposed to all of the keywords in the existing user data 112, is to reduce the computation complexity of the machine learning models. As will be described, the machine learning models can be communicated to client devices to select persona categories and, optionally, context categories. Reducing the computation complexity of the machine learning models reduces the amount of processing resources used by client devices to process the machine learning models. In this regard, experimentation has shown that at least a 95% category prediction accuracy can be achieved using 10% of the available keywords to train the machine learning models.

The machine learning models can be trained periodically to capture changes in data trends. For example, the categorizer 114 can train the machine learning models every hour, every six hours, every twelve hours, every day, every week, every month, etc.

The computing architecture 100 also can include content data 120. The content data 120 can include content to be presented to users and, for each content, metadata assigned to the content. The content can be, for example, in the form of text, audio and/or video. The metadata for each content can indicate a subject to which the content pertains (e.g., one or more keywords), one or more contexts relating to the content, a length of the content (e.g., a duration of playback of content that is in the form of content), a size of the content (e.g., a number of bytes data required to store and/or communicate the content), an image resolution of the content (e.g., in the case the content contains video), likes and dislikes the content has received in one or more social media platforms, personal traits assigned to users who provided the respective likes and dislikes, use contexts applicable to the use of client devices by users who provided the respective likes and dislikes, and so on.

The computing architecture 100 also can include a recommendation engine 124. The recommendation engine 124 can pre-process the existing user data 112 to generate rankings of items, such as content, applications, businesses, etc. for each persona category. For example, from the existing user data 112, the recommendation engine 124 can identify user-content interactions (e.g., application usage history data, transaction history data, content viewing history data, etc.). The recommendation engine 124 can process the identified user-content interactions to generate the rankings for each persona category. Based on the rankings, the recommendation engine 124 can generate at least one persona recommendation 126 for each persona category.

In illustration, the recommendation engine 124 can implement a preference comparison extraction and comparison based ranking algorithm (e.g., a Gravity Ranking Algorithm) to pre-process the existing user data 112. In other arrangements, the recommendation engine 124 can implement collaborative filtering, matrix factorization, or any other suitable algorithm to pre-process the existing user data 112.

Using an algorithm (e.g., a preference comparison extraction and comparison based ranking algorithm), for each user identifier indicated in the existing user data 112, the recommendation engine 124 can perform pairwise comparisons of the items the user has used (e.g., content, applications, businesses, etc.). For example, if a user used Content1, Content2 and Content3, comparisons such as Content1>Content2 and Content2>Content3 (meaning that the user preferred Content1 over Content2 and preferred Content 2 over Content3) can be extracted. Each user identifier can be assigned to at least one persona category. For each persona category, all of the comparisons from all of the users in the category can be aggregated. Further, the recommendation engine 124 can implement a comparison based ranking algorithm to create the rankings of content for each category. In illustration, each persona category can have its own rankings for items such as applications, businesses, content, etc. Based on the rankings, the recommendation engine 124 can assign a score to each item.

The above process is performed periodically (e.g., daily, weekly) to keep the server-side architecture 110 current with recommendation lists for each category. For example, the recommendation engine 124 can periodically implement the above processes every minute, every five minutes, every ten minutes, every thirty minutes, every hour, every six hours, every twelve hours, every day, every week, every month, etc.

Figure 4:
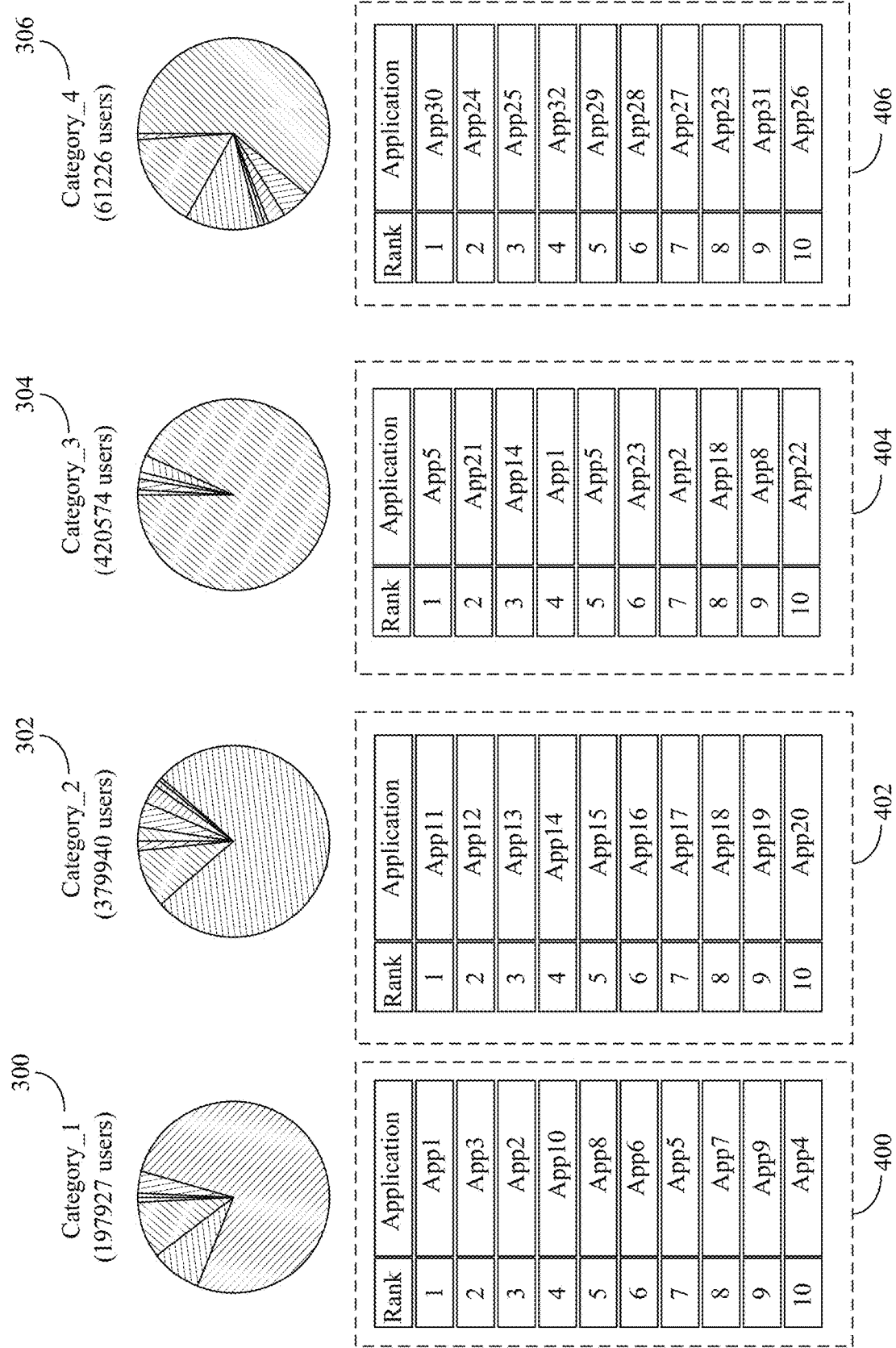
FIG. 4 illustrates examples of persona categories for which applications have been ranked.

FIG. 4 illustrates example persona categories 300, 302, 304, 306 for which persona recommendations 126 have been generated. In this example, applications have been ranked by the recommendation engine 124 to generate the persona recommendations 126, as shown by applications and their respective rankings 400, 402, 404, 406. Content, businesses, etc. can be ranked for the persona categories 300, 302, 304, 306 in a similar manner.

The following table 6 presents an example of a persona recommendation 126, which can indicate various items, their respective rankings and their respective scores.

TABLE 6

| Rank | Item | Score |
|---|---|---|
| 1 | i4 | 76 |
| 2 | i3 | 64 |

TABLE 6-continued

| Rank | Item | Score |
| --- | --- | --- |
| 3 | i1 | 42 |
| 4 | i5 | 17 |
| 5 | i2 | 9 |

In table 6, each row of data indicates a ranking assigned to an item and a score assigned to the item.

Referring again to FIG. 1, optionally, the recommendation engine 124 also can pre-process the existing user data 112 to generate rankings for items, such as content, applications, businesses, etc. for each context category. For example, from the existing user data 112, the recommendation engine 124 can identify contexts in which users use their respective client devices. The recommendation engine 124 can process the identified contexts to generate the rankings for each context category. Based on the rankings, the recommendation engine 124 can generate at least one context recommendation 128 for each context category.

The following table 7 presents an example of a context recommendation 128, which can indicate various items, their respective rankings and their respective scores.

TABLE 7

| Rank | Item | Score |
| --- | --- | --- |
| 1 | i1 | 87 |
| 2 | i5 | 55 |
| 3 | i4 | 51 |
| 4 | i2 | 29 |
| 5 | i3 | 11 |

In table 7, each row of data indicates a ranking assigned to an item and a score assigned to the item.

The recommendation engine 124 can recommend some items based on one or more persona categories, recommend some items based on one or more context categories, and recommend some items based on one or more persona categories and based on one or more context categories. In an arrangement in which both persona recommendations 126 and context recommendations 128 are generated, the recommendation engine 124 can generate combined recommendations 130. The combined recommendations 130 can indicate recommended items based on both the persona recommendations 126 and the context recommendations 128. In a non-limiting arrangement, scores assigned to items in a combined recommendation 130 can be a sum of scores assigned to those items in the persona recommendation 126 and the context recommendation 128 that are combined to generate the combined recommendation 130. Still, the present arrangements are not limited in this regard and the scores can be determined in any other suitable manner.

In a non-limiting arrangement, the recommendation engine 124 can dynamically generate the combined recommendations 130 in response to receiving requests for combined recommendations 130 from client devices. For example, as will be described, a request for a combined recommendation can include categorizations 160 determined by the client device placing the request. In response to the server-side architecture 110 receiving the request, the recommendation engine 124 can identify a persona recommendation 126 and a context recommendation 128 for the persona category and context category indicated by the categorizations 160. The recommendation engine 124 can combine that persona recommendation 126 and that context recommendation 128 into a combined recommendation 130, and communicate the combined recommendation 130 to the client-side architecture 150.

The following table 8 presents an example of a combined recommendation 130, which can indicate various items, their respective rankings and their respective scores. As noted, the various items may include applications, businesses, content, etc.

TABLE 8

| Rank | Item | Score |
| --- | --- | --- |
| 1 | i1 | 129 |
| 2 | i4 | 127 |
| 3 | i3 | 75 |
| 4 | i5 | 72 |
| 5 | i2 | 38 |

In table 8, each row of data indicates a ranking assigned to an item and a score assigned to the item.

In an arrangement, if the number of persona categories and context categories is small enough (e.g., below a threshold number of persona categories), rankings of items for each pair of persona and context categories can be pre-processed. For example, if there are 10 persona categories and 5 context categories, there will be 50 combinations of category pairs. The recommendation engine 124 can pre-process rankings for all 50 combinations of category pairs.

Since, in this example, individual rankings are generated for each pair of persona/context categories, the ranking-combining process described above to generate a combined recommendation 130 need not be performed. Instead, the combined recommendation 130 can be selected from the appropriate persona/context category pair. In illustration, if categorizations 160 received from a client device indicates a persona category and a context category, the recommendation engine 124 can select a persona/context category pair that includes that persona category and that context category, and communicate to the client device a combined recommendation 130 based on the selected persona/context category pair.

The client-side architecture 150 can include user data 152. The user data 152 stored on each client device represents use of that client device by a user. The user data 152 can be processed by the client device to determine one or more persona traits of the user and, optionally, one or more context traits pertaining to a context in which the user uses the client device.

The user data 152 can be processed by the client device to determine one or more persona categories and/or one or more context categories to assign to the user of the client device. The user data 152 can include, for example, raw data indicating a list of applications installed on the client device, raw data indicating application usage on the client device (e.g., events, such as installation, start of use and end of use, pertaining to current application usage and application usage), raw data indicating a current geographic location of the client device (e.g., global positioning system (GPS) coordinates and/or other GPS data), raw data past geographic locations of the client device, time stamps corresponding to application usage and detection of GPS coordinates, user profile information, and so on. The user data 152 can be collected by an operating system of the client device.

The following table 9 presents an example of raw user data than may be included in the user data 152.

TABLE 9

| raw_data_type | app_name | event_type | time_stamp |
|---|---|---|---|
| app_usage | app1 | start | 1533922354 |
| app_usage | app1 | end | 1533922414 |
| app_install | app2 | install | 1533922549 |
| app_usage | app4 | start | 1533923119 |
| app_usage | app4 | end | 1533923301 |
| app_usage | app3 | start | 1533924131 |
| app_usage | app3 | end | 1533924277 |
| app_install | app5 | install | 1533924943 |
| app_usage | app2 | start | 1533925021 |
| app_usage | app2 | end | 1533925217 |
| app_install | app2 | uninstall | 1533925184 |
| ... | ... | ... | ... |

In table 9, each row of data indicates a particular record for a particular raw data type. The record can include the raw data type, the name of the application corresponding to the raw data type, the type of event corresponding to the raw data type, and the time stamp event corresponding to the raw data type.

In the case that a client device is configured to allow multiple users to individually log into the device, the client device can store user data 152 for each user. User data 152 (e.g., private user data) that is not being collected by the server-side architecture 110 can be stored, at least temporarily, on a computer-readable storage medium of the client device without such user data 152 being communicated to the server-side architecture 110. In illustration, a user of the client device can choose to keep certain user data 152 private via user settings of the client device. For example, the user can opt out of data collection services, and user data 152 specified by the opt out setting will not be communicated to the server-side architecture 110. Moreover, some countries and states have strict privacy policies that restrict collection of user data considered to be private data, and such user data will not be communicated to the server-side architecture 110. Further, the user may not be logged into the information system serving information to users via the server-side architecture 110, and thus the user data 152 is not communicated to the server-side architecture 110.

In a conventional information system, absent receiving the user data 152, it is not possible to select information to present to the user based on the user data 152. Further, it is undesirable to execute computation-heavy algorithms on client devices to select information to present to the user based on the user data 152. To do so can result in heavily loading processing resources on the client devices, resulting in poor performance of the client devices and, thus, degrading the users' experiences using the client devices. Moreover, to store all available information on the client devices to make that information readily available typically would utilize too much data storage space on the client devices, and thus also is not desirable. The present arrangements provide processes to select information for users based on the user data 152 in a manner that overcomes the aforementioned obstacles. Indeed, the present arrangements generate personalized information selection results upon request, without sharing the user data 152 that is to remain private with the server-side architecture 110, and without overly taxing processing and data storage resources on client devices.

The client-side architecture 150 also can include a trait selector 154. The trait selector 154 can be configured to identify traits 156 indicated in the user data 152. For example, the trait selector 154 can identify persona traits pertaining to the persona of the user. Optionally, the trait selector 154 can identify context traits pertaining to a context in which the user uses the client device. Further, the trait selector 154 can generate a summary of the identified traits 156. The trait selector 154 also can access other data stored on the client device, for example application information, to include in the summary. The summary can indicate types of traits, information about each type of trait, and a score for each type of trait.

In illustration, the trait types can include, for example, application usage, application category usage and keyword scores. The application usage can represent usage of a particular application by the user on the client device. The application category usage can represent usage of a particular category of applications by the user on the client device. The keyword score can indicate a usage of applications by the user on the client device that are assigned a particular keyword. The trait information can indicate names of the applications used by the user on the client device, types of applications used by the user on the client device, and particular keywords assigned to applications used by the user on the client device. The scores can indicate a number of times each application is used, a number of times applications in each application category are used, and a number of times applications assigned particular keywords are used. The trait selector 154 can determine such numbers of times over a threshold period of time, for example over the last hour, over the last day, over the last week, over the last month, over the last year, and so on.

The following table 10 presents an example of the summary of the traits identified in the user data 152.

TABLE 10

| trait_type | trait_info | score |
|---|---|---|
| app_usage | app1 | 171 |
| app_usage | app2 | 4 |
| app_usage | app3 | 46 |
| ... | ... | ... |
| app_category_usage | game_action | 491 |
| app_category_usage | game_casual | 53 |
| app_category_usage | finance | 17 |
| ... | ... | ... |
| keyword_score | golf | 37 |
| keyword_score | used car | 19 |
| keyword_score | fitness | 108 |
| ... | ... | ... |

In table 10, each row of data indicates a particular record for a particular trait. The record can include the trait type, the trait information and the score for that trait type. Optionally, responsive to generating the summary of the traits 156, the trait selector 154 can delete the user data 152 used to generate the traits 156. As new raw data is captured in the user data 152, the trait selector 154 can update the summary of the traits 156 to include in the summary the additional traits indicated by the new raw data. For example, the trait selector 154 can periodically update the traits 156, for example every minute, every five minutes, every ten minutes, every thirty minutes, every hour, every six hours, every twelve hours, every day, every week, every month, etc.

The client-side architecture 150 also can include a categorization selector 158. Based on the traits 156, the categorization selector 158 can determine to which categories to assign the user of the client device.

In illustration, the categorization selector 158 can communicate a request to the server-side architecture 110 requesting the persona categorization data 116. In response, the server-side architecture 110 can communicate the persona categorization data 116 to the categorization selector 158. Optionally, the categorization selector 158 can communicate a request to the server-side architecture 110 requesting the context categorization data 118. In response, the server-side architecture 110 can communicate the context categorization data 118 to the categorization selector 158. The categorization selector 158 can store the persona categorization data 116 and, optionally, the context categorization data 118 to a computer-readable storage medium of the client device. The categorization selector 158 can periodically request, and receive from the server-side architecture 110, updated persona categorization data 116 and, optionally, the context categorization data 118 from the server-side architecture 110, for example every hour, every six hours, every twelve hours, every day, every week, every month, etc.

The categorization selector 158 can process the traits 156 to identify each type of trait and its corresponding trait information and score. The categorization selector 158 can compare that data to the persona categories and, optionally, the context categories to identify the persona categories and, optionally, the context categories with which the traits 156 most closely match. The categorization selector 158 can assign the user of the client device to those persona categories and, optionally, context categories. The categorization selector 158 can indicate the assigned category(ies) as categorization(s) 160. The categorization selector 158 can store the categorization(s) 160, at least temporarily, to a computer-readable storage medium of the client device.

As noted, in an arrangement, the persona categorization data 116 can include selected keywords and one or more trained machine learning models that predict persona categorizations. Optionally, the context categorization data 118 can include selected keywords and one or more trained machine learning models that predict context categorizations. The categorization selector 158 can input the keywords and their respective scores determined by the trait selector 154 (see table 7) into the machine learning models. The machine learning models can process the keywords and their scores to determine at least one persona category and, optionally, at least one context category, to which to assign the user of the client device. The categorization selector 158 can indicate the assigned category(ies) as categorization(s) 160. As noted, the categorization selector 158 can store the categorization(s) 160, at least temporarily, to a computer-readable storage medium of the client device.

The client-side architecture also can include a recommendation requester/filter 162. The recommendation requester/filter 162 can communicate to the server-side architecture 110 a request requesting one or more persona recommendations 126. In another arrangement, the recommendation requester/filter 162 can communicate to the server-side architecture 110 a request for one or more combined recommendations 130. Regardless of which type of request is communicated, the request can include the categorization(s) 160 determined by the categorization selector 158. In response to the request, the server-side architecture 110 can communicate to the recommendation requester/filter 162 the persona recommendation(s) 126 or the combined recommendation(s) 130, in accordance with the request, that pertain to the category(ies) indicated in the categorization(s) 160.

In another arrangement, rather than communicating to the server-side architecture 110 the categorizations 160, the request communicated to the server-side architecture 110 can request all of the persona recommendations 126 or all of the combined recommendations 130. In such arrangement, the recommendation requester/filter 162 can select one or more persona recommendations 126 or one or more combined recommendations 130 based on the categorization(s) 160.

In a non-limiting arrangement, for example an arrangement in which the client device implements one or more trained machine learning models that predict a plurality of persona categories and, optionally, a plurality of context categories, the trained machine learning model(s) can rank the categories, and include such rankings in the categorizations 160. The recommendation engine 124 can identify the rankings in the categorizations 160. Based, at least on part, on the categories and the ranks assigned to the respective categories, the recommendation engine 124 can dynamically generate a new persona recommendation 126 and, optionally, a new context recommendation 128 and a new combined recommendation 130. For example, when determining scores for respective items indicated in the recommendations 126-130, the recommendation engine 124 can weigh each score based on the ranking assigned to the category for which the respective item is selected.

In a further arrangement, the categorization selector 158 can assign a percentage value to each of the categories based on the categorization traits and their respective scores indicated in the traits 156 (see table 10). For example, the categorization selector 158 can implement a trained machine learning algorithm to assign the percentage values to each of the categories. Further, based on the percentage values, the categorization selector 158 can determine the rank for each category based on the percentage values. The percentage values can be values that the recommendation engine 124 is to apply to the weight of each category when dynamically generating for the user a persona recommendation 126 and, optionally, the context recommendation 128 and combined recommendation 130.

In illustration, when selecting items to include in the recommendation(s) in the persona recommendation 126 and, optionally, the context recommendation 128, the recommendation engine 124 can identify items assigned to each category, and identify the scores assigned to those items based on the categories to which the items are assigned. The recommendation engine 124 can multiply those scores by the percentage values assigned to the respective categories to which the items are assigned. Accordingly, greater weight can be given to scores for items assigned to higher ranked categories, and lesser weight can be given to scores for items assigned to lower ranked categories, The categorization selector 158 can include the rankings and percentage values for the respective categories in the categorizations 160. The following table 11 presents an example of the categories, the assigned rankings and the assigned percentage values.

TABLE 11

| cat_01 | cat_02 | cat_03 | cat_04 | cat_01 | cat_02 | cat_03 | cat_04 |
| --- | --- | --- | --- | --- | --- | --- | --- |
| 4 | 3 | 1 | 2 | 0.05 | 0.15 | 0.6 | 0.2 |

In table 11, the values "4," "3," "1" and "2" in the left most four columns are rankings assigned to the respective categories "cat_01," "cat_02," "cat_03" and "cat_04." The values "0.05," "0.15," "0.6" and "0.2" in the right most four columns are percentage values assigned to the respective categories "cat_01," "cat_02," "cat_03" and "cat_04" based on their rankings.

The recommendation requester/filter 162 can filter the items indicated in the persona recommendation 126 or, optionally, the combined recommendation 130 received from the server-side architecture 110. For example, the recommendation requester/filter 162 can filter out items indicated in the recommendation that are not pertinent to the user of the client device. For example, the recommendation requester/filter 162 can interface with the operating system of the client device to identify applications already installed on the client device. Assume that the items indicated in a persona recommendation 126 (or a combined recommendation 130) include one or more applications that already are installed on the client device. The recommendation requester/filter 162 can remove such items from the persona recommendation 126 (or the combined recommendation 130) received from the server-side architecture 110.

Further, the recommendation requester/filter 162 can implement one or more trained machine learning models to adjust the item scores, and thus rankings, indicated in the persona recommendation 126 (or the combined recommendation 130) based on specific persona traits of the user of the client device and, optionally, context traits of the use of the client device by the user. For example, the recommendation requester/filter 162 can increase the score/ranking of items that are related to the user's most recent activities (e.g., activities that have occurred within a threshold period of time, for instance within the last five minutes, ten minutes, thirty minutes, hour, day, etc.).

The client-side architecture 150 also can include a user interface 164. Via the user interface 164, the recommendation requester/filter 162 can present information 166 to the user. In illustration, the recommendation requester/filter 162 can recommend the user use the item contained in the persona recommendation 126 (or the combined recommendation 130) having the highest ranking/score. For example, the information 166 can suggest that the user install an application having the highest ranking/score, view content having the highest ranking/score, patronize a business having the highest ranking/score, etc. The recommendation requester/filter 162 can present the information 166, for instance, via a display and/or via an output audio transducer of the client device.

Figure 5:
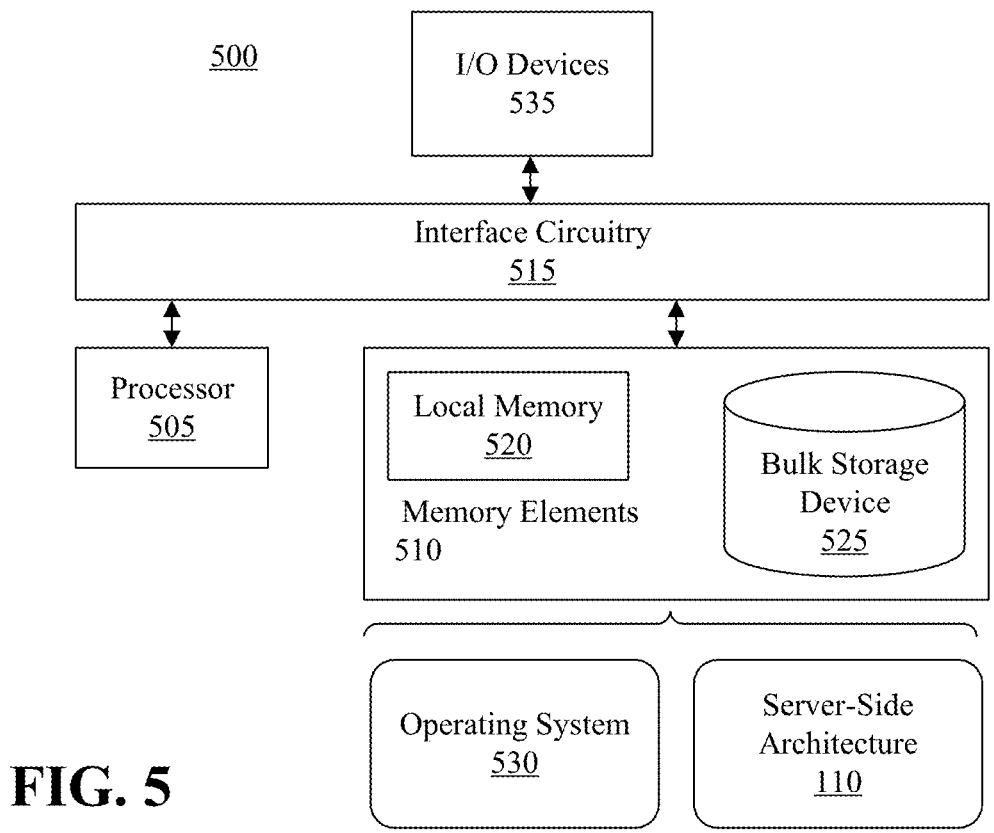
FIG. 5 illustrates an example architecture for a server-side data processing system.

FIG. 5 illustrates an example of a server-side data processing system (hereinafter "system") 500 for use with one or more arrangements described herein. The system 500 is capable of performing the various operations described herein relating to a hosting the server-side architecture 110 described herein. In an aspect, the system 500 is implemented as a computer or other system or device that is suitable for storing and/or executing program code. For example, the system 500 can be implemented as one or more servers.

The system 500 includes at least one processor 505. The processor 505 is coupled to interface circuitry 515. The system 500 stores computer-readable instructions (also referred to as "program code") within the memory elements 510. The memory elements 510 are an example of computer-readable storage media. The processor 505 executes the program code accessed from the memory elements 510 via interface circuitry 515.

The memory elements 510 include one or more physical memory devices such as, for example, local memory 520 and one or more bulk storage devices 525. Local memory refers to non-persistent memory device(s) generally used during actual execution of program code. Examples of local memory include random-access memory (RAM) and/or any of the various types of RAM that are suitable for use by a processor during execution of program code (e.g., dynamic RAM or "DRAM", synchronous DRAM or "SDRAM", and double data rate RAM or "DDR RAM"). A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory. The system 500 may also include one or more cache memories (not shown) that provide temporary storage of at least some program code in order to reduce the number of times program code must be retrieved from a bulk storage device during execution.

The memory elements 510 are capable of storing program code. The program code may include routines, programs, objects, components, logic, data structures, and so on. For purposes of illustration, the memory elements 510 stores an operating system 530 and the server-side architecture 110. The server-side architecture 110 can include one or more applications. The categorizer 114 (FIG. 1) and recommendation engine 124 (FIG. 1) can be implemented as components of the one or more applications.

In an aspect, the operating system 530 and application(s), being implemented in the form of executable program code, are executed by the system 500 and, more particularly, by processor 505, to perform the operations described within this disclosure as being performed by the server-side architecture 110. As such, operating system 530 and application(s) may be considered an integrated part of the system 500. Further, it should be appreciated that any data used, generated, and/or operated upon by the system 500 (e.g., processor 505) are functional data structures that impart functionality when employed as part of the system.

Examples of interface circuitry 515 include, but are not limited to, an input/output (I/O) subsystem, an I/O interface, a bus system, and a memory interface. For example, interface circuitry 515 may be one or more of any of several types of bus structures, including a memory bus or memory controller, a peripheral bus, an accelerated graphics port, and a processor or local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The client device 600 further may include one or more input/output (I/O) devices 535 coupled to interface circuitry 515. I/O devices 535 may be coupled to the system 500, e.g., interface circuitry 515, either directly or through intervening I/O controllers. Examples of I/O devices 535 include, but are not limited to, a keyboard, a display device, a pointing device, one or more communication ports, a network adapter, etc. A network adapter refers to circuitry that enables the client device 600 to become coupled to other systems, computer systems, remote printers, and/or remote storage devices through intervening private or public networks. Modems, cable modems, Ethernet cards, and wireless transceivers are examples of different types of network adapters that may be used with the client device 600.

The system 500 may include fewer components than shown or additional components not illustrated in FIG. 5 depending upon the particular type of device and/or system that is implemented. In addition, the particular operating system and/or application(s) included may vary according to device and/or system type as may the types of I/O devices included. Further, one or more of the illustrative components may be incorporated into, or otherwise form a portion of, another component. For example, a processor may include at least some memory.

Figure 6:
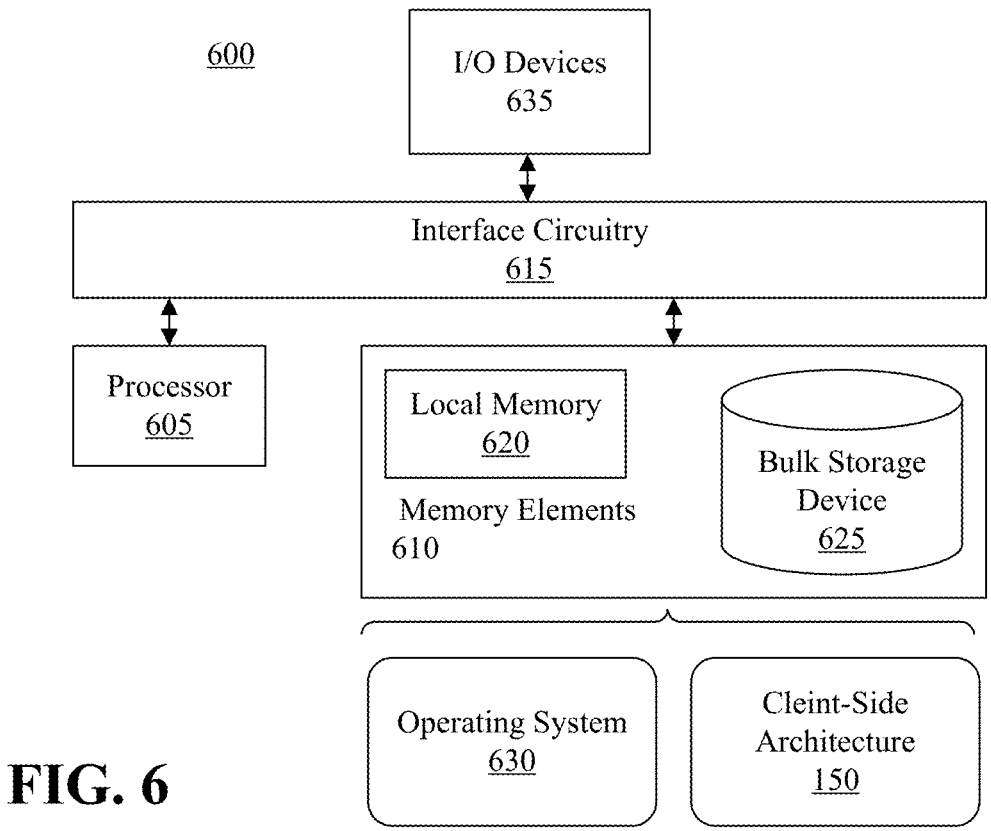
FIG. 6 illustrates an example architecture for a client device.

FIG. 6 illustrates an example architecture for a client device 600 for use with one or more arrangements described herein. The client device 600 is capable of performing the various operations described herein relating to hosting the client-side architecture 150 described herein.

The client device 600 includes at least one processor 605. The processor 605 is coupled to memory 610 through interface circuitry 615. The client device 600 stores computer-readable instructions within the memory 610. The memory 610 is an example of computer-readable storage media. The processor 605 executes the program code accessed from the memory 610 via interface circuitry 615.

The memory 610 includes one or more physical memory devices such as, for example, local memory 620 and one or more bulk storage devices 625. The client device 600 may also include one or more cache memories (not shown) that provide temporary storage of at least some program code in order to reduce the number of times program code must be retrieved from a bulk storage device during execution.

The memory 610 is capable of storing program code. The program code may include routines, programs, objects, components, logic, data structures, and so on. For purposes of illustration, the memory 610 stores an operating system 630 and the client-side architecture 150. The client-side architecture 150 can include one or more applications. The trait selector 154 (FIG. 1), categorization selector 158 (FIG. 1) and the recommendation requester/filter 162 (FIG. 1) can be implemented as components of the one or more applications.

In an aspect, the operating system 630 and application(s), being implemented in the form of executable program code, are executed by the client device 600 and, more particularly, by the processor 605, to perform the operations described within this disclosure. As such, the operating system 630 and application(s) may be considered an integrated part of the client device 600. Further, it should be appreciated that any data used, generated, and/or operated upon by the client device 600 (e.g., processor 605) are functional data structures that impart functionality when employed as part of the system.

Examples of interface circuitry 615 include, but are not limited to, an input/output (I/O) subsystem, an I/O interface, a bus system, and a memory interface. For example, interface circuitry 615 may be one or more of any of several types of bus structures, including a memory bus or memory controller, a peripheral bus, an accelerated graphics port, and a processor or local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The client device 600 further may include one or more input/output (I/O) devices 635 coupled to interface circuitry 615. I/O devices 635 may be coupled to the client device 600, e.g., interface circuitry 615, either directly or through intervening I/O controllers. Examples of I/O devices 635 include, but are not limited to, a keyboard, a display device, an output audio transducer, a pointing device, one or more communication ports, a network adapter, etc. A network adapter refers to circuitry that enables the client device 600 to become coupled to other systems, computer systems, remote printers, and/or remote storage devices through intervening private or public networks. Modems, cable modems, Ethernet cards, and wireless transceivers are examples of different types of network adapters that may be used with the client device 600.

The client device 600 may include fewer components than shown or additional components not illustrated in FIG. 6 depending upon the particular type of device and/or system that is implemented. In addition, the particular operating system and/or application(s) included may vary according to device and/or system type as may the types of I/O devices included. Further, one or more of the illustrative components may be incorporated into, or otherwise form a portion of, another component. For example, a processor may include at least some memory.

FIG. 7 illustrates an example of a method 700 of presenting information to a user based on persona categorization data. The method 700 can be implemented by client devices, for example the client device 600 of FIG. 6.

At step 702 the client device can identify user data pertaining to use of the client device by a user. At step 704 the client device can determine at least one persona trait of the user based on the user data pertaining to the use of the client device by the user. At step 706 the client device can receive persona categorization data, the persona categorization data specifying a plurality of persona categories and, for each persona category, a plurality of persona traits. For example, the client device can receive the persona categorization data from the system 500 of FIG. 5.

At step 708, based on the at least one determined persona trait of the user, the client device can assign the user to at least one persona category selected from the plurality of persona categories specified by the persona categorization data. At step 710, based on the at least one of the persona category to which the user of the client device is assigned, the client device can identify information to present to users who are assigned to the at least one persona category to which the user is assigned. At step 712, the client device can present to the user the identified information.

Figure 8:
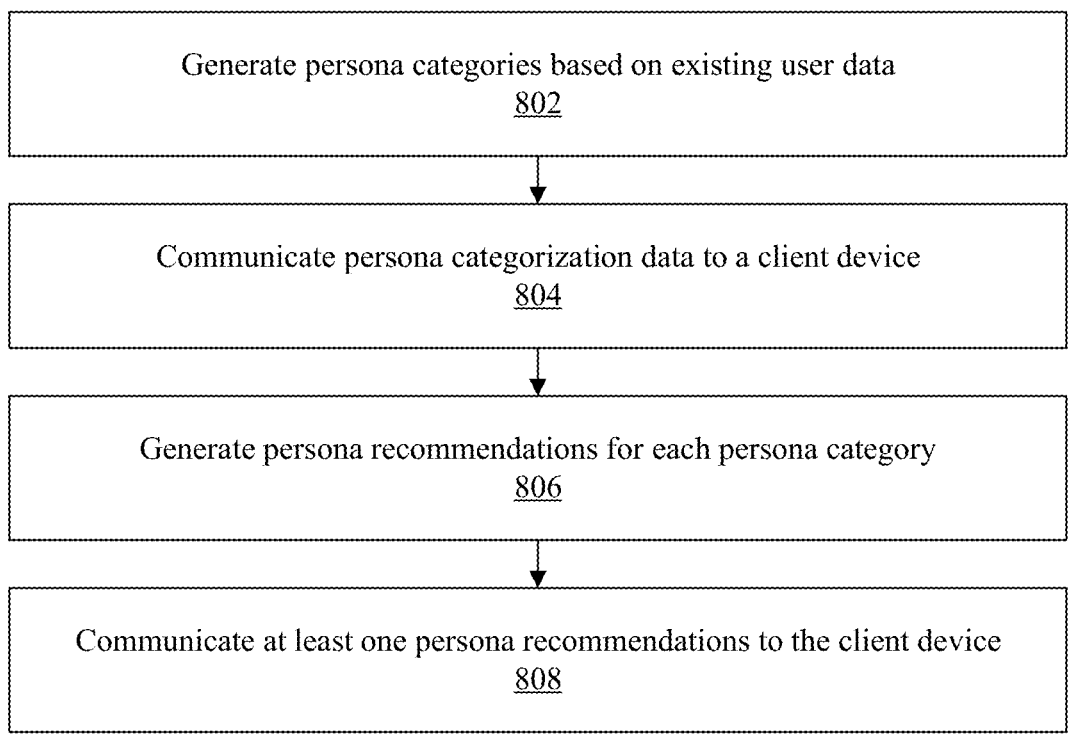
FIG. 8 illustrates an example of a method of communicating persona recommendations to a client device.

FIG. 8 illustrates an example of a method 800 of communicating persona recommendations to a client device. The method can be implemented by the data processing system 500 of FIG. 5.

At step 802 the data processing system can generate persona categories based on existing user data. Optionally, the data processing system also can generate context categories based on the existing user data.

At step 804 the data processing system can communicate persona categorization data to a client device. The persona categorization data can specify the persona categories and, for each persona category, a plurality of persona traits. Optionally, the data processing system also can communicate context categorization data to the client device. The context categorization data can specify the context categories and, for each content category, a plurality of context traits.

At step 806 the data processing system can generate persona recommendations for each persona category. Optionally, the data processing system can generate context recommendations for each context category. Further, the data processing system can combine persona recommendations and context recommendations into combined recommendations.

At step 808 the data processing system can communicate at least one of the persona recommendations to the client device. Optionally, the data processing system can communicate to the client device a combined recommendation that includes the at least one persona recommendation.

The terminology used herein is for the purpose of describing particular embodiments only and is not intended to be limiting. Notwithstanding, several definitions that apply throughout this document now will be presented.

As defined herein, the term "persona category" means a category to which a plurality of users is assigned based on persona traits of the users.

As defined herein, the term "persona trait" means a trait exhibited by one or more users while using respective client devices.

As defined herein, the term "context category" means a category to which a plurality of users is assigned based on contexts in which the users use respective client devices.

As defined herein, the term "client device use context" means a context in which one or more users use their respective client devices.

As defined herein, the term "context trait" means a trait indicating the context in which one or more users use their respective client devices.

As defined herein, the term "content" means text, audio and/or video configured to be presented to a user by a client device. Examples of such content include, but are not limited to, advertisements, questionnaires, advisements, etc.

As defined herein, the term "client device" means a data processing system including at least one processor and memory that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein. A server is not a client device as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "user" means a human being.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer-readable storage medium" means a storage medium that contains or stores program code for use by or in connection with an instruction execution system, apparatus, or device. As defined herein, a "computer-readable storage medium" is not a transitory, propagating signal per se. A computer-readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer-readable storage media. A non-exhaustive list of more specific examples of a computer-readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one arrangement," "an arrangement," "one or more arrangements," or similar language mean that a particular feature, structure, or characteristic described in connection with the arrangement is included in at least one arrangement described within this disclosure. Thus, appearances of the phrases "in one arrangement," "in an arrangement," "in one or more arrangements," and similar language throughout this disclosure may, but do not necessarily, all refer to the same arrangement. The terms "arrangement" and "embodiment" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" and similar language as described above, e.g., "if," "when," or "upon," mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

The terms first, second, etc. may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the present invention. Within this disclosure, the term "program code" is used interchangeably with the term "computer-readable program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may specify state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:
1. A method, comprising:
  identifying, by a client device, user data pertaining to use of the client device by a user;
  storing, by the client device, the user data without sharing with a server-side data processing system at least a portion of the user data that is determined to remain private;

determining, by the client device, at least one persona trait of the user based on the user data pertaining to the use of the client device by the user;

receiving, by the client device and from the server-side data processing system, persona categorization data including a machine learning model trained by the server-side data processing system, the machine learning model being executable to predict at least one persona category from a plurality of persona categories;

assigning, by the client device executing the machine learning model, the user to at least one persona category of the plurality of persona categories based on the at least one determined persona trait of the user;

determining, by the client device, at least one context trait of present use of the client device by the user based on the user data pertaining to the use of the client device by the user, the user data pertaining to the use of the client device by the user comprising at least one trait type pertaining to an application category usage and a score for the application category usage;

receiving, by the client device and from the server-side data processing system, context categorization data including a further machine learning model trained by the server-side data processing system, the further machine learning model being executable to predict a context categorization from a plurality of context categorizations;

assigning, by the client device executing the further machine learning model, the present use of the client device by the user to at least one context category selected from the plurality of context categories based, at least in part, on the at least one determined context trait of the present use of the client device by the user;

sending the at least one persona category and the at least one context category to the server-side data processing system and identifying, by the server-side data processing system, based on the data received from the client device, information to present to users who are assigned to the at least one persona category and the at least one context category to which the user is assigned;

receiving the information from the server-side data processing system, wherein the information specifies a list of a plurality of applications recommended to install on the client device of the user, wherein each application of the plurality of applications is ranked by the server-side data processing system;

adjusting the rankings of one or more of the plurality of applications of the list based on recent user activities detected within a selected threshold period of time;

determining, by interacting with an operating system of the client device, applications installed on the client device and filtering the list to remove the applications installed on the client device from the list; and recommending to the user, by a user interface of the client device, the information as filtered and ranked post adjusting.

2. The method of claim 1, wherein:
the recommending, by the client device, to the user the information comprises presenting to the user a recommendation to install an application having a highest ranking determined based on the existing user data.

3. The method of claim 1, wherein:
the information from the server-side data processing system includes a plurality of persona recommendations, each of the plurality of persona recommendations generated based on existing user data pertaining to other users assigned to a particular persona category;

selecting, by the client device, at least one of a plurality of persona recommendations included in the information based on the at least one persona category to which the user is assigned by the client device; and the recommending, by the client device, to the user the information comprises presenting to the user a recommendation to use an item contained in the at least one persona recommendation selected by the client device.

4. The method of claim 1, wherein:
the information from the server-side data processing system includes a combined recommendation, the combined recommendation comprising at least one persona recommendation and at least one context recommendation, the persona recommendation and the context recommendation each generated based on existing user data pertaining to other users assigned to the at least one persona category and existing user data pertaining to device use contexts of other users assigned to the at least one context category; and the recommending, by the client device, to the user the information comprises presenting to the user a recommendation to use an item contained in the combined recommendation.

5. The method of claim 1, wherein:
the information from the server-side data processing system includes a plurality of combined recommendations, each of the plurality of combined recommendations comprising at least one persona recommendation and at least one context recommendation, the persona recommendation generated based on existing user data pertaining to other users assigned to the at least one persona category and the context recommendation generated based on existing user data pertaining to the other users whose use of respective client devices are assigned to the at least one context category;

the client device selects at least one of the plurality of the combined recommendations based on the at least one persona category to which the user is assigned by the client device and the at least one context category to which the present use of the client device by the user is assigned by the client device; and the recommending, by the client device, to the user the information comprises presenting to the user a recommendation to use an item contained in the at least one combined recommendation selected by the client device.

6. A client device, comprising:
a memory configured to store instructions;
a processor coupled to the memory, wherein the processor, in response to executing the instructions, is configured to initiate operations for including:
identifying, by the client device, user data pertaining to use of the client device by a user;
storing, by the client device, the user data without sharing with a server-side data processing system at least a portion of the user data that is determined to remain private;
determining, by the client device, at least one persona trait of the user based on the user data pertaining to the use of the client device by the user;
receiving, by the client device and from the server-side data processing system, persona categorization data including a machine learning model trained by the server-side data processing system, the machine learning model being executable to predict at least one persona category from a plurality of persona categories;

assigning, by the client device executing the machine learning model, the user to at least one persona category of the plurality of persona categories based on the at least one determined persona trait of the user;

determining, by the client device, at least one context trait of present use of the client device by the user based on the user data pertaining to the use of the client device by the user, the user data pertaining to the use of the client device by the user comprising at least one trait type pertaining to an application category usage and a score for the application category usage;

receiving, by the client device and from the server-side data processing system, context categorization data including a further machine learning model trained by the server-side data processing system, the further machine learning model being executable to predict a context categorization from a plurality of context categorizations;

assigning, by the client device executing the further machine learning model, the present use of the client device by the user to at least one context category selected from the plurality of context categories based, at least in part, on the at least one determined context trait of the present use of the client device by the user;

sending the at least one persona category and the at least one context category to the server-side data processing system and identifying, by the server-side data processing system, based on the data received from the client device, information to present to users who are assigned to the at least one persona category to which the user is assigned;

receiving the information from the server-side data processing system, wherein the information specifies a list of a plurality of applications recommended to install on the client device of the user, wherein each application of the plurality of applications is ranked by the server-side data processing system;

adjusting the rankings of one or more of the plurality of applications of the list based on recent user activities detected within a selected threshold period of time;

determining, by interacting with an operating system of the client device, applications installed on the client device and filtering the list to remove the applications installed on the client device from the list; and recommending to the user, by a user interface of the client device, the information as filtered and as ranked post adjusting.

7. The client device of claim 6, wherein:
the recommending, by the client device, to the user the information comprises presenting to the user a recommendation to install an application having a highest ranking determined based on the existing user data.

8. The client device of claim 6, wherein:
the information from the server-side data processing system includes a plurality of persona recommendations, each of the plurality of persona recommendations generated based on existing user data pertaining to other users assigned to a particular persona category;

selecting, by the client device, at least one of the plurality of the persona recommendations based on the at least one persona category to which the user is assigned by the client device; and the recommending, by the client device, to the user the information comprises presenting to the user a recommendation to use an item contained in the at least one persona recommendation selected by the client device.

9. The client device of claim 6, wherein:
the information from the server-side data processing system includes a combined recommendation, the combined recommendation comprising at least one persona recommendation and at least one context recommendation, the persona recommendation and the context recommendation each generated based on existing user data pertaining to other users assigned to the at least one persona category and existing user data pertaining to device use contexts of other users assigned to the at least one context category; and the recommending, by the client device, to the user the information comprises presenting to the user a recommendation to use an item contained in the combined recommendation.

10. The client device of claim 6, wherein:
the information from the server-side data processing system includes a plurality of combined recommendations, each of the plurality of combined recommendations comprising at least one persona recommendation and at least one context recommendation, the persona recommendation generated based on existing user data pertaining to other users assigned to the at least one persona category and the context recommendation generated based on existing user data pertaining to the other users whose use of respective client devices are assigned to the at least one context category;

the client device selects at least one of the plurality of the combined recommendations based on the at least one persona category to which the user is assigned by the client device and the at least one context category to which the present use of the client device by the user is assigned by the client device; and the recommending-presenting, by the client device, to the user the information comprises presenting to the user a recommendation to use an item contained in the at least one combined recommendation selected by the client device.

11. A computer program product, comprising:
a computer-readable storage medium having program code stored thereon, the program code executable by computer hardware to initiate operations including:

identifying, by a client device, user data pertaining to use of the client device by a user;

storing, by the client device, the user data without sharing with a server-side data processing system at least a portion of the user data that is determined to remain private;

determining, by the client device, at least one persona trait of the user based on the user data pertaining to the use of the client device by the user;

receiving, by the client device and from the server-side data processing system, persona categorization data including a machine learning model trained by the server-side data processing system, the machine learning model being executable to predict at least one persona category from a plurality of persona categories;

assigning, by the client device executing the machine learning model, the user to at least one persona category of the plurality of persona categories based on the at least one determined persona trait of the user;

determining, by the client device, at least one context trait of present use of the client device by the user based on the user data pertaining to the use of the client device by the user, the user data pertaining to the use of the client device by the user comprising at least one trait type pertaining to an application category usage and a score for the application category usage;

receiving, by the client device and from the server-side data processing system, context categorization data including a further machine learning model trained by the server-side data processing system, the further machine learning model being executable to predict a context categorization from a plurality of context categorizations;

assigning, by the client device executing the further machine learning model, the present use of the client device by the user to at least one context category of the plurality of context categories based, at least in part, on the least one determined context trait of the present use of the client device by the user;

sending the at least one persona category and the at least one context category to the server-side data processing system and identifying, by the server-side data processing system, based on the data received from the client device, information to present to users who are assigned to the at least one persona category to which the user is assigned;

receiving the information from the server-side data processing system, wherein the information specifies a list of a plurality of applications recommended to install on the client device of the user, wherein each application of the plurality of applications is ranked by the server-side data processing system;

adjusting the rankings of one or more of the plurality of applications of the list based on recent user activities detected within a selected threshold period of time;

determining, by interacting with an operating system of the client device, applications installed on the client device and filtering the list to remove the applications installed on the client device from the list; and recommending to the user, by the client device, the information as filtered and as ranked post adjusting.

12. The computer program product of claim 11, wherein:
the recommending, by the client device, to the user the information comprises presenting to the user a recommendation to install an application having a highest ranking determined based on the existing user data.

13. The computer program product of claim 11, wherein:
the information from the server-side data processing system includes a plurality of persona recommendations, each of the plurality of persona recommendations generated based on existing user data pertaining to other users assigned to a particular persona category;

selecting, by the client device, at least one of the plurality of the persona recommendations based on the at least one persona category to which the user is assigned by the client device; and the recommending, by the client device, to the user the information comprises presenting to the user a recommendation to use an item contained in the at least one persona recommendation selected by the client device.

14. The computer program product of claim 11, wherein:
the information from the server-side data processing system includes a combined recommendation, the combined recommendation comprising at least one persona recommendation and at least one context recommendation, the persona recommendation and the context recommendation each generated based on existing user data pertaining to other users assigned to the at least one persona category and existing user data pertaining to device use contexts of other users assigned to the at least one context category; and the recommending, by the client device, to the user the information comprises presenting to the user a recommendation to use an item contained in the combined recommendation.

15. The method of claim 1, wherein:
the machine learning model generates a ranking of the plurality of persona categories predicted for the user and the further machine learning model generates a ranking of the plurality of context categorizations predicted for the user;

the client device provides the ranking of the plurality of persona categories and the ranking of the context categorizations to the server-side data processing system;

the information from the server-side data processing system includes a combined recommendation, the combined recommendation including at least one persona recommendation and at least one context recommendation, the persona recommendation and the context recommendation each generated based on existing user data pertaining to other users, the ranking of the plurality of persona categories, and the ranking of context categorizations; and the recommending includes presenting to the user a recommendation to use an item contained in the combined recommendation.

* * * * *